United States Patent [19]

Reid

[11] Patent Number: 4,546,541
[45] Date of Patent: Oct. 15, 1985

[54] METHOD OF ATTACHING ELECTRICAL CONDUCTORS TO THIN FILM MAGNETIC TRANSDUCER

[75] Inventor: James Reid, Goleta, Calif.

[73] Assignee: Applied Magnetics Corporation, Goleta, Calif.

[21] Appl. No.: 542,050

[22] Filed: Oct. 14, 1983

[51] Int. Cl.$^4$ .............................................. G11B 5/42
[52] U.S. Cl. ..................................... 29/603; 360/127; 360/129
[58] Field of Search .................... 29/603; 360/127, 129

[56] References Cited

U.S. PATENT DOCUMENTS

| 4,143,458 | 3/1979 | Gibson | 29/603 |
| 4,370,801 | 2/1983 | Roscamp et al. | 29/603 |
| 4,435,900 | 3/1984 | de Wilde | 29/603 |

Primary Examiner—Carl E. Hall
Attorney, Agent, or Firm—Daniel J. Meaney, Jr.

[57] ABSTRACT

A method of attaching electrical conductors to a thin film magnetic transducer having a transducing element and a plurality of substantially planar conductive leads formed into a predetermined pattern comprising the steps of mounting the thin film magnetic transducer on a substrate adjacent a medium contacting surface with the conductive leads thereof extending from the medium contacting surface, positioning an electrical circuit member having on one side thereof a plurality of planar connecting elements which have a relatively thin diffusible conductive metal coating contiguous the conductive leads, placing a quantity of curable epoxy bonding material adjacent the plurality of planar connecting elements of the thin film transducer wherein the epoxy bonding material is selected of a material having a curing temperature which is less than the thermal stress temperature of a thin film magnetic transducer wherein at least one of the electrical characteristics and the magnetic characteristics of the thin film magnetic transducer are permanently destroyed, controllably heating the subassembly and urging the substrate and the plurality of planar connecting elements of the electrical circuit member together with a clamping force at a temperature in a bonding temperature range for a time period sufficient to enable the epoxy bonding material to substantially fill by capillary action the space between the substrate and the electrical circuit member and to enable the conductive leads of the thin film magnetic transducer to bond with the connecting elements to form a subassembly is shown.

10 Claims, 10 Drawing Figures

Fig_8

Fig_9

Fig_10

METHOD OF ATTACHING ELECTRICAL CONDUCTORS TO THIN FILM MAGNETIC TRANSDUCER

BACKGROUND OF THE INVENTION

1. Field of the Invention

This invention relates to a new novel method of manufacturing a thin film magnetic head assembly having a thin film magnetic transducer, substrate, and an electrical circuit means having a plurality of electrical conductors formed thereon, and more particularly to a method of attaching a plurality of electrical conductors to conductive leads of a plurality of thin film magnetic transducers wherein the electrical circuit means has leads having a diffusable conductive metal layer formed thereon. The method includes the steps of mounting the thin film transducer on the substrate, positioning the electrical conductors having the diffusible conductive metal coating in intimate contact with the conductive leads on the transducer, placing a quantity of insulating bonding material in the vicinity of the substrate, thin film transducer and electrical circuit member which form a subassembly, and heating and clamping and maintaining the so-clamped subassembly at a selected curing temperature for a preselected period of time to enable the insulating bonding material by capillary action to encapsulate the thin film magnetic transducer, the substrate and the electrical circuit member and to bond the same into an integral thin film head assembly.

2. Description of the Prior Art

It is known in the prior art to manufacture ferrite magnetic heads having at least two pole pieces formed of sintered ferromagnetic oxide material wherein the pole pieces are joined together with a short gap therebetween to form the transducing portion thereof and wherein the pole pieces are bonded together by glass. Typical of such known methods are the methods disclosed in U.S. Pat. Nos. 3,577,634; 3,246,383 and 3,024,318. Magnetic heads manfactured by the above known methods are combined with housings or ceramic sliders to form magnetic head assemblies used in apparatus, systems and equipment for storing and retrieving information in a recording media.

In order to produce smaller magnetic head assemblies, reduce the size of the gap forming the transducing portion of such magnetic head assemblies and to increase the recording densities and decrease the track widths of such magnetic head assemblies, new techniques have been developed to produce thin film magnetic transducers. Such thin film magnetic transducers can be fabricated by use of known vapor deposition, sputtering or plating techniques. Typical of such thin film magnetic transducers produced by use of the vapor deposition techniques are those disclosed in U.S. Pat. Nos. 3,867,368 and 3,846,841. Other thin film transducers are disclosed in U.S. Pat. Nos. 4,052,749 and 4,092,688.

With the rapid advance in techniques for manufacturing thin film magnetic transducers, the prior art includes many known techniques for fabricating the thin film magnetic head assemblies using thin film magnetic transducers. Typically, epoxy, glass bonding and other adhesives are used to form an integral bonded thin film magnetic head assembly.

One such glass bonding technique is disclosed in U.S. Pat. Nos. 4,143,458 and 4,191,983 to George W. Gibson, and assigned to the same Assignee as is this present invention.

It is also known in the art to fabricate a thin film assembly having a substrate, a superstrate and thin film magnetic transducer mounted therebetween wherein the thin film magnetic transducer includes conductive leads located interior to and extending between the substrate and superstrate. In fabricating such a thin film magnetic head assembly, the electrical leads are coated with a diffusable conductive metal coating. Also, the bonding is performed by use of an insulating bonding material, such as glass, which is selected of material which is electrically and magnetically compatible with the thin film magnetic transducer.

In order to obtain suitable bonding, the subassembly is heated and clamped which requires that the insulating bonding material have a melting point temperature which is below the thermal stress temperature at which at least one of the electrical characteristics and the magnetic characteristics of the thin film magnetic transducer are permanently distorted. As the subassembly is heated and clamped at a bonding temperature which is at a predetermined range, the insulating bonding material substantially fills the space between the transducer, substrate and superstrate and the area in the vicinity of the conductive leads of the transducer and the conductive leads of the connecting elements would be attached thereto through a diffusible conductive metal coating thereon to encapsulate and bond a thin film magnetic transducer, connecting elements and conductive leads having the diffused electrical connection therebetween into a thin film magnetic head assembly.

SUMMARY OF THE INVENTION

The present invention discloses, teaches and claims a significant improvement in fabrication and assembly of thin film magnetic head assemblies using a thin film, vapor deposited, magnetic transducer.

Gibson in U.S. Pat. No. 4,143,458 discloses that known thin film magnetic transducers when heated to a temperature above 500° C. causes irreversible damage to the magnetic and/or electrical characteristics of the thin film magnetic transducer causing the same to be permanently destroyed. Thus, the temperature at which either the magnetic or electrical characteristics of the thin film transducer would be affected establishes a thermal stress temperature which cannot be exceeded during fabrication of thin film magnetic head assemblies.

The use of glass bonding techniques in certain of the above referenced U.S. patents for fabricating ferrite poles pieces use glass materials that have melting temperatures in the order of 900° C. to insure that the coefficient of expansions of the ferrite and glass insulating and bonding material are substantially the same.

In the method of making a thin film magnetic head assembly disclosed in the above referenced U.S. Pat. No. 4,143,458, the use of a glass bonding material having a melting point below the thermal stress temperature is disclosed. A glass bonding material in the form of a thin rod located exterior to the assembly formed of the substrate, superstrate and thin film magnetic transducer is drawn into a cavity within the assembly by capillary action. The glass bonding material and the assembly are maintained at a bonding temperature located in a temperature range of the melting point of the glass material and the thermal stress temperature. The cavity within the assembly was formed by means of a spacing member. In order to insure that conductive leads from the thin film transducer were not encapsulated in the glass bonding material and would be accessible for attachment of connecting leads or elements thereto, the quantity of glass materially drawn in to the cavity had to be precisely controlled.

The method of fabricating a thin film magnetic head assembly using capilliary action to draw the insulating bonding material between a substrate and superstrate, which form the two sides of the thin film magnetic transducer, has the transducer and the transducer conductive leads, which are joined to the electrical leads through the diffused conductive metal bond, located between the substrate and superstrate. The ends of the substrate and superstrate are then lapped along with the transducer on the side thereof having the transducing gap to form a medium contacting surface formed of the material itself which is not highly resistant to abrading by a medium being transported thereacross.

The present invention teaches a novel and unique method of assembling a thin film magnetic head assembly by using a subassembly formed of a substrate, thin film magnetic transducer and an electrical circuit member having planar connecting elements having a diffusible conductive metal coating layer thereon and a quantity of insulating epoxy material which encapsulates the subassembly. The electrical circuit member connecting elements have formed on at least one surface thereof a diffusible conductive metal coating layer. The subassembly is heated in a preselected atmosphere, which inhibits oxidation and corrosion of the subassembly, at a selected curing temperature and is subjected to a clamping force during the heating to the bonding temperature. The heated and clamped subassembly is subsequently maintained at the curing temperature for a predetermined period of time resulting in an epoxy bonded thin film magnetic head assembly wherein both the substrate thin film magnetic transducer and electrical circuit member electrical connecting elements which are mechanically and electrically connected to the conductive leads of the thin film transducers by a diffused electrical connection are encapsulated by the epoxy bonding material.

One advantage of the present invention is that the method for making the thin film magnetic head assemblies results in the conductive leads of the thin film magnetic transducers used therein being mechanically and electrically joined to electrical connecting elements of an electrical circuit means and that electrical connection being encapsulated by the epoxy bonding material to insure a hermetically sealed connection while the portion of the thin film magnetic transducer having the transducing element is hermetically sealed between a substrate and spacer formed of a material which is highly resistant to being abraded by a medium moving thereacross.

Another advantage of present invention is that the connecting members extend from the thin film magnetic head assembly and are adapted to be mechanically bonded to the electrical connecting elements while being supported by the bonded electrical circuit member.

A further advantage of the present invention is that by use of an electrical circuit means in the form of a laminated, flexible printed circuit board, the thin film magnetic head assemblies can be fabricated with the electrical connecting elements of the electrical circuit means held in place during the manufacturing process and when completed, a spacer formed of a material which is highly resistant to being abraded by a medium being transported thereacross can be bonded to and encapsulate the portion of the thin film magnetic transducer having the transducing element such that only that portion of the thin film magnetic transducer which engages the medium is formed of the highly resistant material.

BRIEF DESCRIPTION OF THE DRAWING

The foregoing and other advantages and features of this invention will become apparent from the following description of the preferred embodiment, when considered together with the illustrations and accompanying drawing which includes the following Figures.

DESCRIPTION OF THE PREFERRED EMBODIMENT

Figure 1:
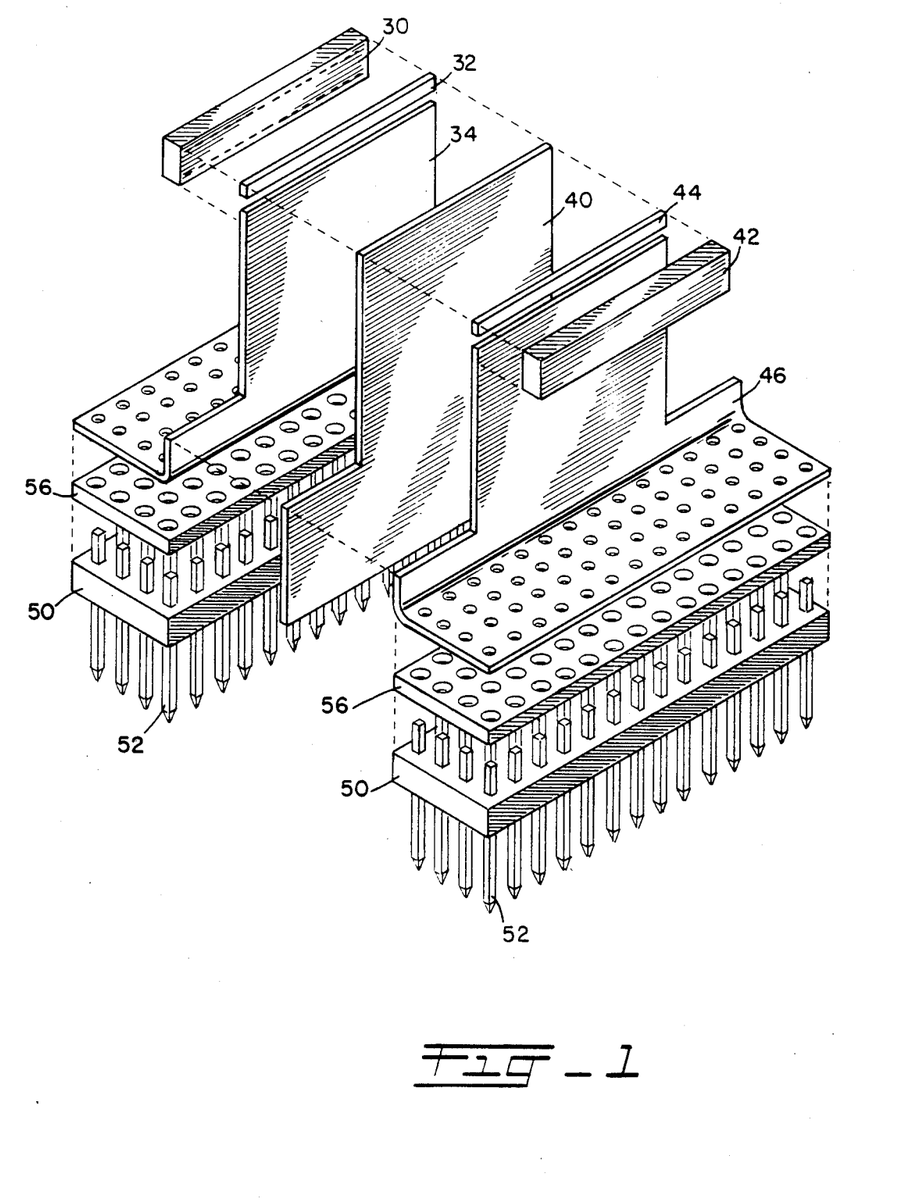
FIG. 1 is an exploded perspective view of two transducing subassemblies and feed-through shield which is assembled using the method of the present invention.
Figures 2, 3:
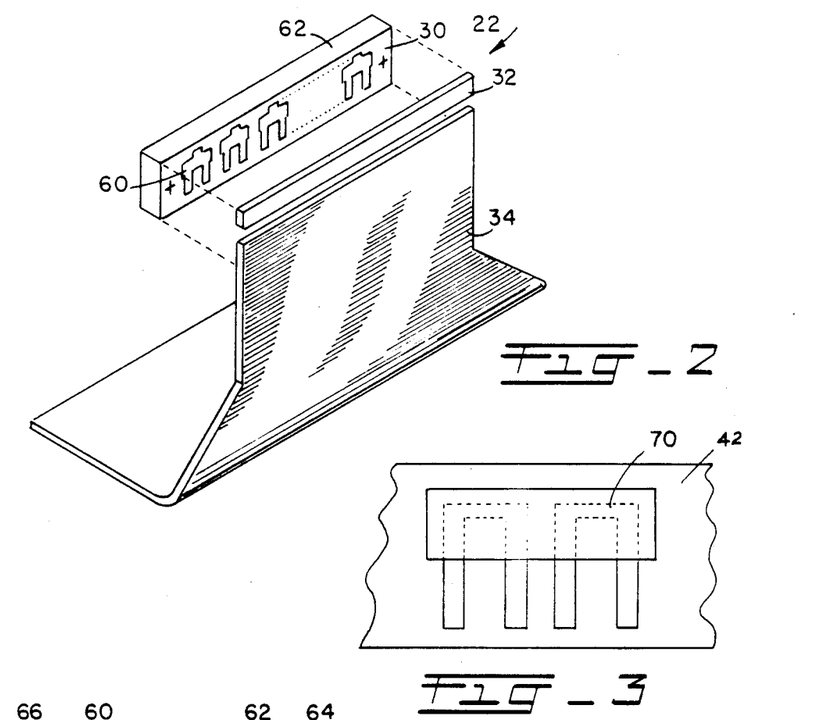
FIG. 2 is an exploded perspective view of a write transducing subassembly utilizing inductive thin film transducers formed using the teaching of this invention.
FIG. 3 is a pictorial representation of the substrate having magnetoresistive thin film transducers.

FIG. 1 illustrates a multi-track read-while-write magnetic tape head assembly, adapted for use with a recording medium having a write transducing subassembly 22 (shown in FIG. 2) comprising a first substrate 30, first spacer 32 and an electrical circuit means 34. The first substrate 30 is formed of a material which is highly resistant to being abraded by a medium being transported thereacross. The first substrate 30 has a medium contacting surface and a supporting surface which is substantially perpendicular to the medium contacting surface. The first substrate 30 supports a transducer having a transducing element located on one side and leads located on a different side. The transducing element is located adjacent the medium contacting surface and with the leads extending along the supporting surface away from the medium contacting surface. The construction of a substrate with inductive transducers is shown in detail in FIG. 4 and the construction of a substrate with magnetoresistive thin film transducers is shown in FIG. 3.

A first spacer 32 is formed of a material which is highly resistant to being abraded by a medium and having a medium contacting surface of a preselected width and sidewalls extending substantially perpendicular therefrom. The first spacer 32 is positioned such that one of the sidewalls is adjacent the substrate supporting surface and contiguous the transducer with the transducing gap located therebetween.

An electrical circuit member 34 terminates in an edge having a width which does not exceed the preselected width of the first spacer 32. The electrical circuit member 34 has spaced, opposed outer surfaces which extend substantially perpendicular from the edge and one of the sidewalls thereof has exposed conductors. The sidewall of the electrical circuit member 34 is positioned to the supporting surface of the first substrate 30 wherein the exposed conductors make intimate electrical contact with said leads of the transducer. The electrical circuit member 34 has its edge spaced from the first spacer 32 and from the transducing element.

A read transducing subassembly 24 (shown in FIG. 4) includes a second substrate 42 having a transducer which, in the preferred embodiment, is a thin film magnetoresistive transducer, mounted thereon. The second substrate 42 is formed of the same material as the first substrate 30. The read transducing subassembly 24 further includes a second spacer 44 and a second electrical circuit means 46. The construction of these elements is the same as those of the write transducing subassembly 22.

As illustrated in FIG. 1, the read-while-write magnetic head tape assembly 20 includes the write transducing subassembly 22 and the read transducing subassembly 24. The first electrical circuit member 34 and the second electrical circuit member 46 are each adapted to be electrically connected to electrical connector pins 52 which are supported and held in position by electrical pin supporting web 50. An electrical connector spacer 56 is located between the electrical circuit member 34 and the second electrical circuit member 46 of each transducing subassembly and the electrical pin supporting web 50.

In the preferred embodiment, the write transducing subassembly 22 and read transducing subassembly 24 may comprise a plurality of thin film transducers to form a nine-track magnetic tape head. However, it is envisioned that the transducing subassemblies may comprise any number of transducers which may be in multiples of nine such as for example, eighteen thin film transducers to form an eighteen track read-while-write magnetic tape head assembly. In a typical nine-track magnetic tape head, the write track width is typically in the order of 44 mils and the read track width is typically in the order of 40 mils with a center spacing of about 55 mils.

In one embodiment of the multi-track read-while-write magnetic tape head assembly 20 shown in FIG. 1, tape speeds in the order of 100 inches per second (ips) were utilized with tape tension in the order of 8 ounces and with a tape wrap angle of about 9.5° or about 4.5° on each side. The magnetic tape had a width of about ½ inch, was a 3M Brand type 777 tape. The first substrate 30, the second substrate 42, the first spacer 32 and the second spacer 44 were formed of mixture of aluminum oxide and titanium carbide ($Al_2O_3$-TiC).

One mixture of aluminum oxide and titanium carbide which may be used is a high density, fine grained, $Al_2O_3$-TiC composite compound offered for sale by the Technical Ceramic Products Division of 3M Company of St. Paul, Minn. under the trademark "AlSiMag 204".

In this embodiment, the magnetic tape head had a life in excess of 200 months.

FIG. 1 shows the details of the construction of the preferred embodiment of the product, a multi-track read-while-write magnetic tape head assembly 20, produced by the process of this invention. In the preferred embodiment, the write transducing subassembly 22 includes the first substrate 30 which may have eighteen inductive thin film inductive transducers deposited thereon using known state-of-the-art techniques. The first spacer 32 and the second spacer 44 are selected to be formed of a material which is highly resistant to being abraded by a medium being placed in contact therewith and transported thereacross. The width of the first spacer 32 and the second spacer 44 are predetermined and may be in the order of 5 mils. The electrical circuit member 34 and the second electrical circuit member 46 are likewise selected to have a predetermined width which is substantially the same as that of the first spacer 32 and second spacer 44, respectively. In one embodiment of the multi-track read-while-write magnetic tape head assembly 20, the spacing between the lower edges of the first spacer 32 and the second spacer 44 and its respective electrical circuit member 34 and second electrical circuit member 46 were in the order of about 5 mils.

In the preferred embodiment, the electrical circuit member 34 and second electrical circuit member 46 were flexible electrical circuits having a web formed of insulating material and electrical conductors which are well known in the state of the art. The flexible electric circuit include electrical terminals having a cross-sectional area which is precisely positioned on the flexible electrical circuit web at the end thereof. The electrical terminals are capable of being pierced by the electrical connector pins 52. The electrical connector pins 52 are electrically connected to the electrical terminal by soldering.

As shown in FIG. 1, the feed-through shield 40 is formed of a magnetic material having high permeability and good wear characteristics. The feed-through shield 40 will wear at a higher rate than the first substrate 30, the second substrate 42, the first spacer 32 and the second spacer 44 resulting in a differential wearing surface. The feed-through shield 40 essentially shields the magnetoresistive thin film transducers affixed to the second substrate 42 from feed-through effects of the inductive thin film transducers affixed to the first substrate 30.

Figure 4:
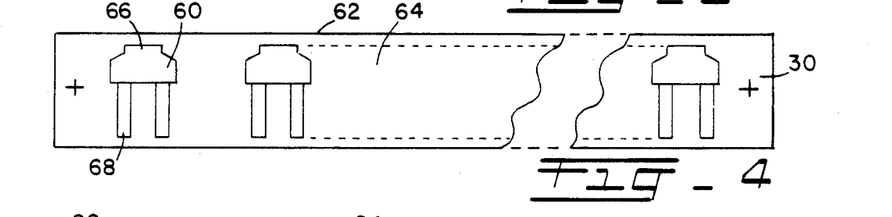
FIG. 4 is a front plan view of a substrate having a plurality of inductive thin film transducers mounted thereon.

FIGS. 2 and 4 show the details of the first substrate 30 including its medium contacting surface 62 and its supporting surface 64 which is substantially perpendicular to the medium contacting surface 62. In FIG. 4, a plurality of spaced, planar inductive thin film transducers 60 are mounted with their respective transducing elements 66 one side thereof adjacent the medium contacting surface 62 and the respective leads 68 extending from the other side thereof and located on the supporting surface 64 and away from the medium contacting surface 62.

FIG. 3 illustrates that substrate 42 has the magnetoresistive thin film transducers, of which transducer 70 is typical, deposited thereon.

Of course any known magnetoresistive thin film transducer or inductive thin film transducer may be used in producing this invention and may be located on either the first substrate 30 or the second substrate 42, as the case may be.

Figure 5:
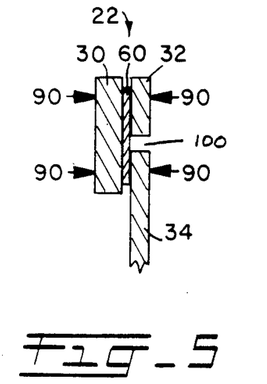
FIGS. 5, 6, and 7 illustrate by cross-sectional views of the various steps of the method of the present invention.
Figure 6:
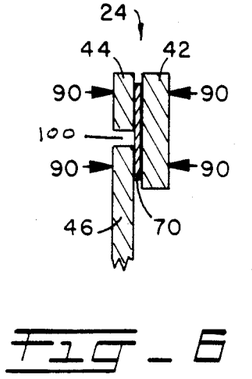
Figure 7:
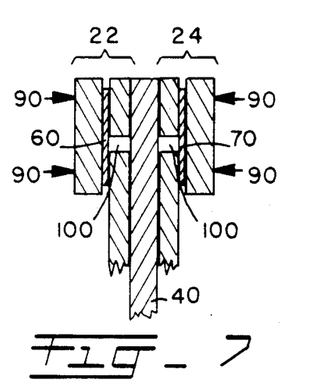

FIGS. 5, 6, and 7 illustrate the steps of the method of forming the multi-track read-while-write magnetic tape head assembly 20. In the preferred embodiment, the write transducing subassembly 22 is formed in one sub-process and the read transducing subassembly 24 is formed by a second sub-process. Thereupon the write transducing subassembly 22 and the read transducing subassembly 24 are assembled with the feed-through shield 40 therebetween to form the multi-track read-while-write magnetic tape head assembly 20. The electrical circuit means 34 and the second electrical circuit means 46 are then connected to the electrical connector pins 52 supported by electrical pin supporting web 50.

In the preferred embodiment, a method of manufacturing either of the transducing head subassembly for a multi-track read-while-write magnetic head adapted for use with a recording medium comprising the steps of:

(1) affixing a substrate, formed of a material which is highly resistant to being abraded by a medium being transported thereacross and having a medium contacting surface and a supporting surface which is substantially perpendicular to the medium contacting surface, to a transducer having a transducing element located on one side and leads located on a different side with the transducing element located adjacent the medium contacting surface and with the leads extending along the supporting surface away from the medium contacting surface;

(2) bonding a spacer, formed of a material which is highly resistant to being abraded by a medium and having a medium contacting surface of a preselected width spaced sidewalls extending substantially perpendicular therefrom, with one of the sidewalls adjacent the the substrate supporting surface and contiguous said first transducer with the transducing element located therebetween;

(3) bonding and heating an electrical circuit means, which terminates in an edge having a width which does not exceed the preselected width, with spaced, opposed outer surfaces which extend substantially perpendicular from the edge with one of the sidewalls having exposed conductors, to the supporting surface of the spacer wherein solder coated conductors are heated to a temperature wherein the electrical conductors are soldered to the leads of the transducer, the electrical circuit means having its edge spaced from the first spacer and from said transducing element; and (4) applying a clamping force to the transducing assembly during the bonding steps.

The above method can include the steps of bonding a first transducing subassembly and a second transducing subassembly produced with the above process to a feed-through shield 40 and then bonding the feed-through shield 40 with the above applying of a clamping force to form the multi-track read-while-write magnetic tape head assembly 20.

In the alternative, the step of heating in step 3 is desirable in the preferred embodiment to cause the solder coated conductors to be soldered to the leads of the transducer. If only exposed conductors are used, which is an alternative, the step of heating is used and the exposed conductors make intimate contact with the leads of the transducer. The temperature for heating and soldering would be in the order of about 230° C. to 240° C. to flow the solder. The temperature to cure the epoxy depends on the epoxy and would be at a lower temperature than that required for soldering. In the preferred embodiment, the insulating bonding material is selected to be a curable epoxy which has a curing temperature about 200° C. The epoxy may also be cured at room temperature.

The heating step of the process utilizes temperatures in the order of 230° C. to 240° C. for the solder flow. The transducing assembly is held at the solder flow temperature for the time required to flow the solder. In certain applications, it may be necessary to apply a magnetic field for variation of the magnetic film within the transducer. In the preferred embodiment, a thin film transducer having a thermal stress temperature in excess of the temperature of the heating step which flows the solder is required.

After the multi-track read-while-write magnetic tape head assembly 20 is fabricated using the above process, the step of forming a contour on the magnetic head assembly by lapping and polishing the medium contacting surface of the so formed multi-track read-while-write magnetic tape head assembly 20 into the desired shape.

The step of attaching electrical connection pins to the electrical conducting means and the soldering of the electrical connection pins to the electrical conducting means can be prepared after the magnetic head assembly is completed.

As illustrated in FIG. 2, a transducing subassembly is formed of the first substrate 30, the inductive thin film transducers 60, the first spacer 32 and electrical circuit means 34. The first substrate 30 has the inductive thin film transducers 60 affixed thereto by deposition using known deposition processes. The first substrate 30 has the inductive thin film transducers 60 bonded to the first spacer 32 and to the solder coated electrical conductors of the electrical circuit means 34 as shown in FIG. 5. A low viscosity epoxy, cement or other appropriate adhesive is applied to the components of the subassembly while the entire subassembly is clamped under pressure as shown by arrows 90 which depicts a clamping force. Preferably, the entire subassembly is then heated to the required temperature to cause the solder to flow. The low viscosity epoxy (or appropriate adhesive) is drawn into the voids and spaces therebetween and sets to provide the bonding action. The solder on the solder coated electrical conductors of the circuit means will flow and bond to the leads of the transducer. The first substrate 30 is positioned with its medium contacting surface 62 adjacent the medium contacting surface of the first spacer 32. The inductive thin film transducers 60 are positioned in the transducer subassembly with the transducing element 66 located between the supporting surface 64 and the first spacer 32. The edge of the electrical circuit means 34 is spaced from the edge of the first spacer 32 as shown in FIG. 5 by opening 100.

FIG. 6 shows the read transducer subassembly 24 which is formed of the second substrate 42, the magnetoresistive thin film transducers 70, the second spacer 44 and the second electrical circuit means 46. The read transducing subassembly 24 is assembled using the above described process and is held in place during the epoxy curing process by a clamping force shown by arrows 90.

FIG. 7 shows the step of bonding the write transducing subassembly 22, the feed-through shield 40 and the read transducing subassembly 24 into the multi-track read-while-write magnetic head tape assembly 20. A low viscosity epoxy is used as the bonding agent and the entire assembly is subject to a clamping force shown by arrows 90.

Figure 8:
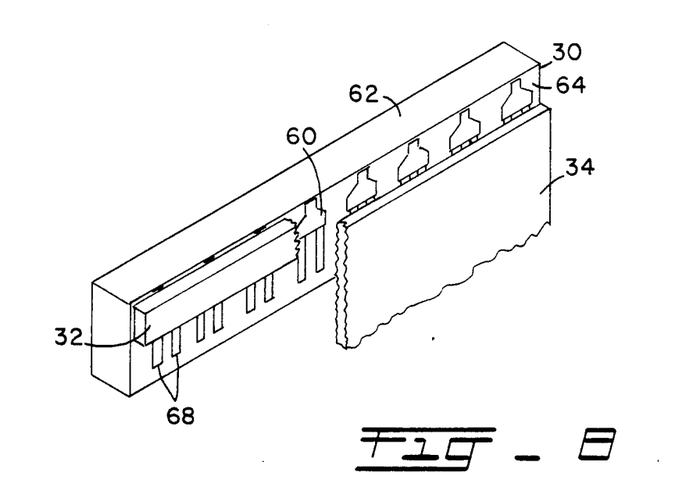
FIG. 8 is a pictorial representation of a thin film magnetic transducing subassembly showing the relationship between the substrate, thin film transducing spacer and electrical circuit member.

FIG. 8 illustrates pictorially the physical relationship between the substrate 30, the spacer 32 and the electrical circuit member 34. As illustrated in FIG. 8, the substrate 30 and spacer 32 encapsulate that portion of the transducer 60 located on supporting surface 64 of spacer 32 which contains a transducing element and the conductive portions 68 thereof, extend below the spacer 32. The substrate 30 and electrical circuit member 34 encapsulate the conductive leads 68 and the electrical connecting members of the electrical circuit means 34 which encapsulate the conductive leads 68. An epoxy is used as the medium for bonding the substrate 30, spacer 32, electrical circuit member 34 and the transducer 60 as an integral thin film magnetic transducer assembly.

Figure 9:
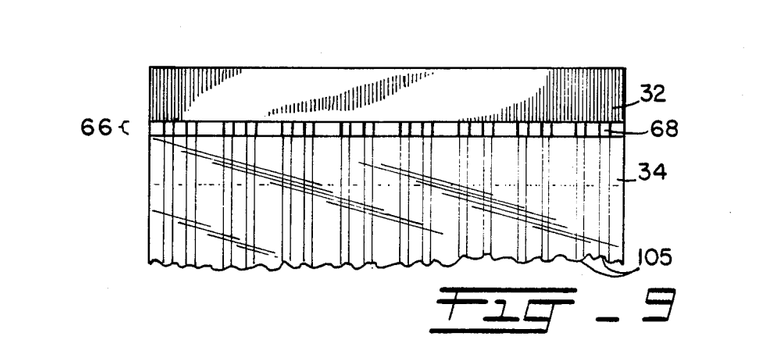
FIG. 9 is a partial front plan view of a thin film magnetic transducing subassembly showing the spacer and substrate encapsulating the portion of the transducing subassembly having the transducing element and showing the electrical circuit means and substrate encapsulating the electrical connecting elements joined to the conductive leads of the thin film magnetic transducer.

FIG. 9 illustrates that an element 66 exists between the spacer 32 and the edge of the electrical circuit member 34 through which the conductive leads 68 can be observed. Since this is a transducer subassembly, when the head assembly is assembled as illustrated in FIG. 7 with the two transducing subassemblies, the conductive leads 68 are basically encapsulated within the assembly. The electrical circuit member 34 has a plurality of spaced, planar connecting elements 105 which are formed in the same pattern as the conductive leads 68.

Figure 10:
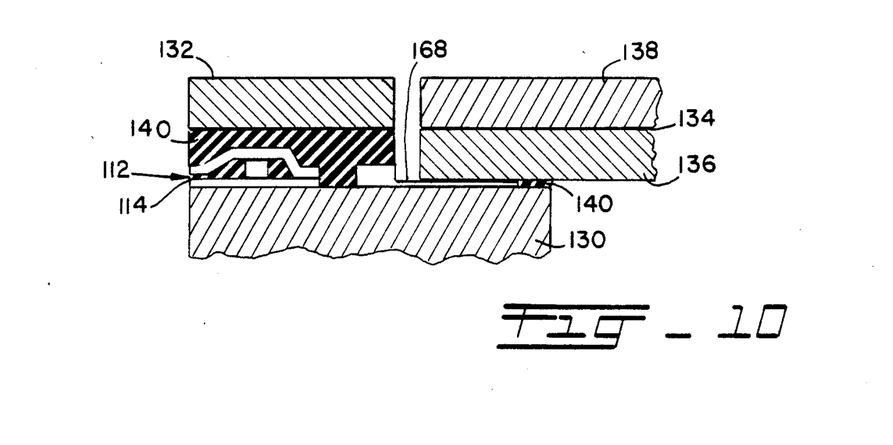
FIG. 10 is a pictorial representation of an assembled and bonded transducer subassembly.

FIG. 10 illustrates pictorially the fabrication of a thin film magnetic transducer using the teachings of this invention. The substrate 130 includes a transducer 112 such that the transducing element 114 is located near the medium contacting surface of the substrate 130. The spacer 132 is positioned with its medium contacting surface adjacent the transducing element 114. The electrical circuit means 134 is mounted such that the electrical conducting means 136 are joined mechanically to the conductive leads 168. An epoxy 140, which is the insulating bonding material, holds the entire head assembly as an integral assembly. The transducer subassembly of FIG. 10 is then assembled into a magnetic head assembly which is formed of two or more transducing subassemblies.

Thus, the present invention teaches a method of attaching electrical conductors to conductive leads of a thin film transducer having transducing element located on side thereof and a plurality of substantially planar conductive leads formed into a predetermined pattern extending therefrom on a different side of the thin film magnetic transducer in a direction opposite to the side thereof having the transducing element comprising the steps of mounting the thin film magnetic transducer on a substrate having a medium contacting surface and supporting surface which is substantially perpendicular to the medium contacting surface wherein the thin film magnetic transducer transducing element is positioned adjacent the medium contacting surface and the conductive leads of the thin film magnetic transducer formed into the predetermined pattern extending along the supporting surface away from the medium contacting surface; positioning an electrical circuit member which terminates in a plurality of planar connecting elements formed in the same predetermined pattern as said thin film magnetic transducer conductive leads wherein the connecting elements include a relatively thin diffusible conductive metal coating located on one side thereof with said one side of the connecting elements having said diffusible conductive metal coating thereon with one of the connecting elements contiguous one of the planar conductive connecting members and with the plurality of planar connecting elements extending along the support surface of the substrate away from the medium contacting surface forming a transducing subassembly; placing a quantity of insulating bonding material adjacent the plurality of planar connecting elements contiguous the conductive leads of the thin film magnetic transducer, said insulating bonding material being selected of a material which is electrically and magnetically compatible with the thin film magnetic transducer and which has a curing temperature below a thermal stress temperature at which at least one of the electrical characteristics and the magnetic characteristics of the thin film magnetic transducer are permanently distorted; controllably heating the subassembly in a preselected atmosphere which inhibits oxidation and corrosion of the subassembly at a heating rate which permits the thermal stresses of the subassembly to be maintained at a level to avoid damage to the subassembly during heating thereof up to a curing temperature located in a bonding temperature range between the curing temperature of the insulating bonding material and below the thermal stress temperature; during the step of controllably heating, urging the substrate and the plurality of planar connecting elements of the electrical circuit means forming the subassembly together with a clamping force to form a compression boundary between the surface of the connecting elements having the diffusible conductive metal coating layer in intimate contact with the conductive leads enabling the diffusible conductive metal coating to diffuse into both the conductive leads and connecting elements to form a diffused electrical connection therebetween; and maintaining the heated and clamped subassembly at a curing temperature within the bonding temperature range for a time period sufficient to enable the insulating bonding material to substantially fill the predetermined space between the substrate and electrical circuit members by capillary action to encapsulate and bond said conductive leads of the thin film magnetic transducer and the connecting elements of the electrical circuit means into a bonded subassembly.

A multi-track read-while-write magnetic tape head assembly 20 can be fabricated by using the process described herein. In its broadest concept, the electrical current member may include electrical conductors extending from the electrical connection pins to an external current.

What is claimed is:

1. A method of simultaneously attaching electrical conductors to conductive leads of a thin film magnetic transducer having a transducing element located on one side thereof and a plurality of substantially planar conductive leads formed into a predetermined pattern extending therefrom on a different side of the thin film magnetic transducer in a direction opposite to the side thereof having the transducing element comprising the steps of     mounting the thin film magnetic transducer on a substrate having a medium contacting surface and a supporting surface which is substantially perpendicular to the medium contacting surface wherein the thin film magnetic transducer transducing element is positioned adjacent the medium contacting surface and the conductive leads of the thin film magnetic transducer formed into the predetermined pattern are extended along the supporting surface away from the medium contacting surface;

positioning an electrical circuit means which terminates in a plurality of planar connecting elements formed in the same predetermined pattern as said thin film magnetic transducer conductive leads wherein the connecting elements include a relatively thin diffusible conductive metal coating located on one side thereof with said one side of the connecting elements having said diffusible conductive metal coating thereon positioned with one of the connecting elements contiguous one of the planar conductive connecting members and with the plurality of planar connecting elements extending along the support surface of the substrate away from the medium contacting surface forming a transducing subassembly;

placing a quantity of curable epoxy bonding material adjacent the plurality of planar connecting elements contiguous the conductive leads of the thin film magnetic transducer, said curable epoxy bonding material being selected of a material which is electrically and magnetically compatible with the thin film magnetic transducer and which has a curing temperature below a thermal stress temperature at which at least one of the electrical characteristics and the magnetic characteristics of the thin film magnetic transducer are permanently distorted;

controllably heating the subassembly at a heating rate which permits the thermal stresses of the subassembly to be maintained at a level to avoid damage to the subassembly during heating thereof up to a temperature located in a bonding temperature range between the curing temperature of the curable epoxy bonding material and below the thermal stress temperature;

during the step of controllably heating, urging the substrate and the plurality of planar connecting elements of the electrical circuit means forming the subassembly together with a clamping force to form a compression boundary between the surface of the connecting elements having the diffusible conductive metal coating layer in intimate contact with the conductive leads enabling the diffusible conductive metal coating to diffuse into both the conductive leads and connecting elements to form a diffused electrical connection therebetween; and maintaining the heated and clamped subassembly at a temperature within the bonding temperature range for a time period sufficient to enable the curable epoxy bonding material to substantially fill the predetermined space between the substrate and spacer electrical circuit member by capillary action to encapsulate and bond said conductive leads of the thin film magnetic transducer and the connecting elements of the electrical circuit member into a bonded subassembly.

2. The method of claim 1 wherein the curable epoxy bonding material is selected of an epoxy having a curing temperature which is substantially less than the thermal stress temperature.

3. The method of claim 2 wherein the curing temperature of the epoxy is about 200° C. and the thermal stress temperature is in excess of about 240° C. and the diffusible material is solder having a flowing temperature in the order of about 230° C. to about 240° C.

4. The method of claim 2 further comprising the step of after the curable epoxy bonding material has substantially filled the predetermined space, controllably cooling the subassembly at a cooling rate which permits the thermal stresses of the subassembly to be maintained at a level to avoid damage to the subassembly during cooling thereof to an ambient temperature.

5. The method of claim 1 wherein the diffusible conductive metal coating is copper.

6. The method of claim 1 wherein the diffusible conductive metal coating is gold.

7. The method of claim 1 wherein the diffusible conductive metal coating is tin.

8. The method of claim 1 further comprising the steps of positioning a spacer formed of a material which is highly resistant to being abraded by a medium and having a medium contacting surface of a preselected width and having spaced, substantially opposed sidewalls extending substantially perpendicular therefrom with one of the sidewalls adjacent the substrate supporting the thin film magnetic transducer and contiguous the side of the thin film magnetic transducer having the transducing element with the transducing element located between the spacer and the substrate;

placing a quantity of the curable epoxy bonding material adjacent the thin film magnetic transducer side having the tranducing element and the spacer; and during the step of controllably heating, urging the substrate and the spacer having that side of the thin film magnetic transducer which has the transducing element together with a clamping force to form a compression boundary therebetween for a time period sufficient to enable the curable epoxy bonding material to substantially fill the predetermined space between the substrate and superstrate by capillary action to encapsulate that side of the thin film magnetic transducer between the substrate and spacer.

9. A method of simultaneously attaching electrical conductors to conductive leads of a plurality of thin film transducers mounted between a substrate and a spacer comprising the steps of positioning an electrical circuit means which terminates in a plurality of planar connecting elements adapted to be connected to the conductive leads of the plurality of thin film transducers wherein the connecting elements include a relatively thin diffusible conductive metal coating locating on one side thereof with said one side of the connecting elements having said diffusible conductive metal coating thereon positioned with one of the connecting elements contiguous one of the planar conductive connecting members forming a transducing subassembly;

placing a quantity of curable epoxy bonding material having a selected curing temperature adjacent the plurality of planar connecting elements contiguous the conductive leads of the thin film magnetic transducer;

controllably heating the subassembly at a heating rate which permits the thermal stresses of the subassembly to be maintained at a level to avoid damage to the subassembly during heating thereof up to the curing temperature;

during the step of controllably heating, urging the substrate and the plurality of planar connecting elements of the electrical circuit member forming the subassembly together with a clamping force to form a compression boundary between the surface of the connecting elements having the diffusible conductive metal coating layer in intimate contact with the conductive leads enabling the diffusible conductive metal coating to diffuse into both the conductive leads and connecting elements to form a diffused electrical connection therebetween; and maintaining the heated and clamped subassembly at a temperature within the bonding temperature range for a time period sufficient to enable the curable epoxy bonding material to substantially fill the predetermined space between the substrate and spacer by capillary action to encapsulate and bond said conductive leads of the thin film magnetic transducer and the connecting elements of the electrical circuit member into a bonded subassembly.

10. The method of claim 9 wherein the curable epoxy bonding material is selected of an epoxy having a curing temperature which is substantially less than the temperature at which at least one of the electrical characteristics and the magnetic characteristics of the thin film magnetic transducers are permanently distorted.

* * * * *